United States Patent [19]
Geisler

[11] 3,725,894
[45] Apr. 3, 1973

[54] PHOTOCELL CONTROLLED SHOPPING CART PACKAGE DETECTOR

[76] Inventor: Edwin A. Geisler, 7339 Central Avenue, Philadelphia, Pa. 19111

[22] Filed: Sept. 27, 1971

[21] Appl. No.: 184,043

[52] U.S. Cl..........................340/280 R, 340/258 B
[51] Int. Cl.............................................G08b 13/00
[58] Field of Search......................340/280 R, 258 B

[56] References Cited

UNITED STATES PATENTS 3,157,871  11/1964  Umanoff..............................340/280

*Primary Examiner*—Harold I. Pitts
*Attorney*—Zachary T. Wobensmith

[57] ABSTRACT

A system for detecting an article or the like on the lower storage section of a market cart as the cart passes through a scanning zone. The cart has a light reflective element mounted thereon operable to reflect a substantial portion of the light projected from a source back to said source. Sensing means are provided having a threshold level and operable to direct a beam of light to said reflective element and produce an output signal only when the intensity of light reflected back to the sensing means exceeds said threshold level. Scanning means are operable when conditioned by the output signal from said sensing means to scan the storage of the cart when it passes through the scanning zone. Signal means are operatively associated with said scanning means actuatable when said scanning means is conditioned and an article is present in the storage section of the cart.

7 Claims, 5 Drawing Figures

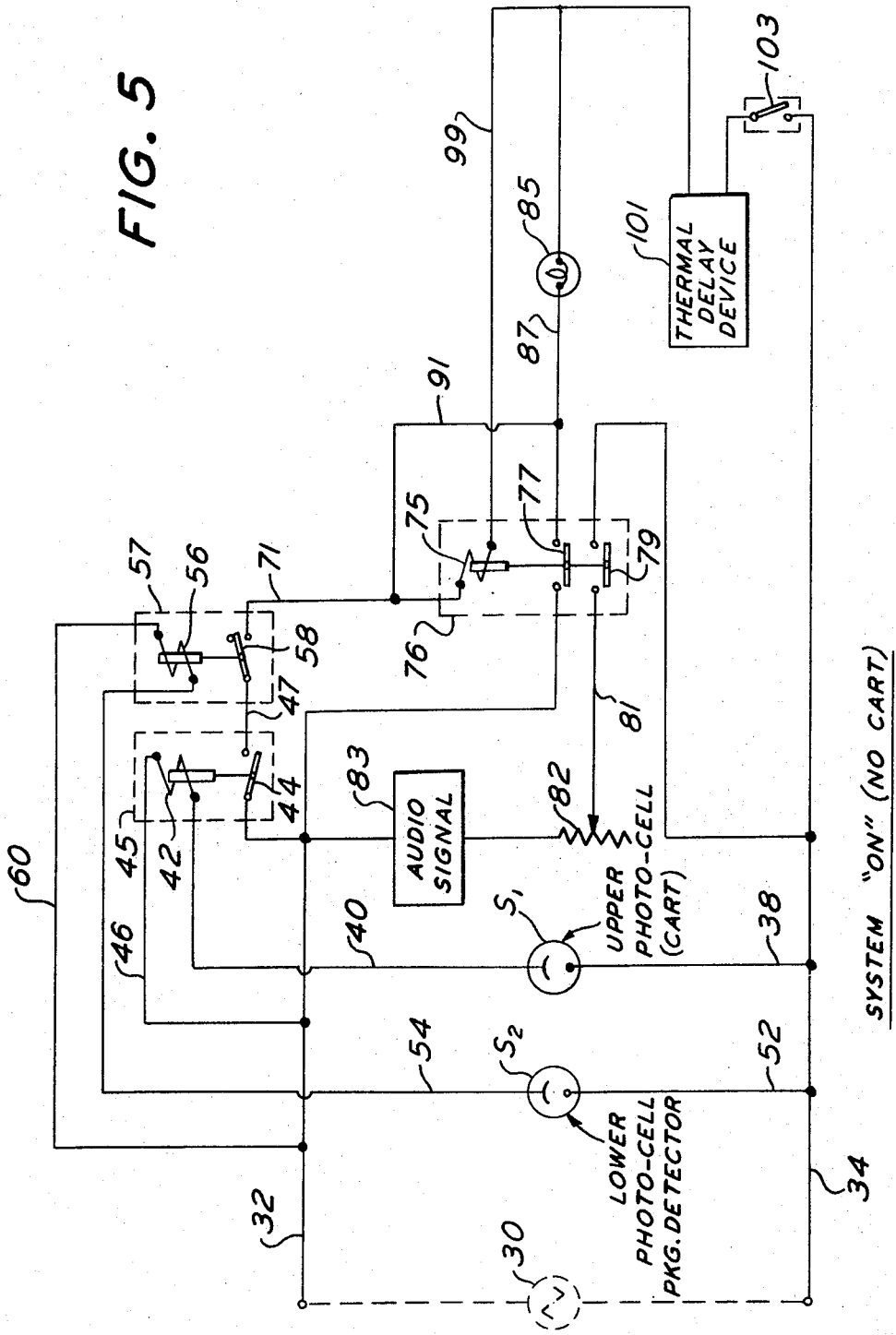

PHOTOCELL CONTROLLED SHOPPING CART PACKAGE DETECTOR

BACKGROUND OF THE INVENTION

1. Field of the Invention

The present invention relates to a detecting system and more particularly to a system for detecting and signalling the presence of articles on the lower shelf of a shopping cart.

2. Description of the Prior Art

The package detection system of the present invention has particular application in supermarkets of the like. Shoppers in these markets usually employ a cart which conventionally comprises a basket mounted on a frame in spaced relation to the lower frame section, thereby providing a shelf below the basket which shoppers often use for storage of items or articles selected from the store. As is conventional in most supermarkets, the checkout area includes a plurality of aisles through which the shopper and cart pass, and where the articles selected by the shopper are declared. Usually there is a counter adjacent the aisle on which the shopper places the articles purchased, and the general arrangement is such that any articles on the lower shelf of the cart are not within easy view of the supermarket checkout personnel. Thus, it has been found that there is a substantial loss to the store by reason of the fact that the articles stored on the lower shelf are often unwittingly or intentionally not declared by the shopper at the checkout area.

Various means have been employed to solve this problem, including the use of mirrors mounted in the aisles to permit checkout personnel to view the lower shelf of carts. However, it has been demonstrated that these have not been satisfactory solutions. For example, checkout personnel often do not employ the mirror to check out the bottom shelf of each cart as it passes through the station, particularly during busy rush hours. Additionally, in most instances the cart is only in the useful range of the mirror during a brief period as it is moved through the checkout area. There is also the danger of accidental breakage of glass mirrors.

There have been systems incorporating photoelectric detection means for this purpose. However, these systems are generally much more complicated and not as advantageous as the system of the present invention. A system of this type is disclosed and claimed in Graveley, U.S. Pat. No. 3,457,423, entitled "Radiation Sensitive Detection System for Shopping Carts". These prior systems have usually included a plurality of photoelectric detection devices and an alarm operatively associated with the detectors, the alarm being operative any time all of the detection devices, except at least one discriminating beam, are intercepted simultaneously. The detection devices are selectively positioned at a plurality of vertically and laterally spaced locations in the aisle so that all of the beams, except at least one, are intercepted by a cart having a package on the lower shelf. This arrangement is designed to discriminate between carts passing through the detection area which have a package on the lower shelf and carts which do not have a package on the lower shelf. However, as a practical matter it has been found that the location of the package on the lower shelf of a cart may be such that it would intercept the discriminating beam and thus not actuate the alarm system. Further, it has been found that it is possible to actuate the alarm by passage through the checkout aisle of something other than a cart with an object on its lower shelf and thus the system does not truly discriminate in all practical cases.

SUMMARY OF THE INVENTION

An object of the present invention is to provide a detection system which scans each cart as it passes through the checkout area and which gives a positive signal to the checkout personnel of the presence of articles on the lower shelf in a manner which is not embarrassing to the customer. To this end, the present system utilizes a reflective element on the cart and there is provided at each checkout aisle a first sensor or sensing means adapted to project a first light beam along a predetermined path to engage the reflector, which first beam when reflected is operative to condition a scanning circuit for scanning the lower shelf of each cart as it passes through the aisle. The scanning circuit includes a second sensor or sensing means projecting a second light beam disposed to be intercepted by an article on the lower shelf of the cart and, in this event, is operable through a circuit to provide an output indication. The indicator can be in the form of an alarm and/or a flashing light disposed adjacent the register and readily visible to the checkout personnel. The reflecting element is preferably in the form of an elongated strip and the sensors are spaced laterally a predetermined distance so that the scanning circuit is conditioned during the time the lower storage space of the cart is in the range of the lower sensor. Accordingly, by this system the scanning circuit is conditioned only when a cart having the reflecting element enters the scanning zone and if, for example, a customer or other object without a reflecting element passes through the zone, the scanning circuit is not conditioned and therefore there is no signal emitted by such a passage through the zone. Accordingly, the system incorporates a discriminating feature and is operative to be conditioned only by a shopping cart entering the scanning zone.

Another feature of the present invention is the use of a reflecting element having "retro-reflective" or "reflex-reflective" capability; that is, one wherein the reflecting surface has a predetermined high reflectance capacity and is operable to reflect a substantial portion of the light from a source back to the source in a wide angular incidence zone, that is the angular zone at which the light from the source engages the reflecting surface. Further, the threshold of the first sensor permits an output signal to condition the scanning circuit only when the reflected beam is within a given small angular receiving range of the sensor, and the light reflected is on an intensity exceeding the threshold of the sensor; that is when the reflected beam is of a predetermined minimum intensity. This arrangement provides a further discriminating factor in the system. For example, it has been found that other reflective elements having a high reflectance and which effect a mirror reflection would not be operative to trigger a conditioning signal from the sensor since the reflected beam would fall outside the angular receiving range of the sensor, because the light beam emitted from the sensor would strike the reflecting element on the cart at a slight downward angle and therefore not return the beam to the sensor. Still other types of reflective elements, which effect diffuse reflection of a beam, would also be inoperative in the present system since they effect diffusion of the reflected light with the result that the reflected portion returning along the transmitted path in the receiving range of the sensor would not be powerful enough to produce a signal from the sensor to condition the scanning circuit. Accordingly, it is apparent that this provides a truly discriminating feature in the system of the present invention.

In the package detection system of the present invention, the second sensor is preferably conditioned to scan the storage area of each cart during the entire period the beam from the second sensor intercepts the storage area. To this end, the retro-reflective element preferably is in the form of an elongated strip mounted on the frame of the cart and is of a predetermined length approximately equal to the length of the storage space below the basket of the cart. Further, the sensors are selectively positioned in the aisle so that as the lead portion of the retro-reflective element is intercepted by the beam from the first sensor, the beam from the second sensor traverses the lead portion of the storage area. Thus, the system will, as a practical matter, detect articles in the storage area substantially irrespective of size or position in the storage area.

The sensors are preferably located downstream of the portion of the checkout area where the customer usually empties the contents of the cart and places articles on the counter so that when the cart passes through the scanning zone it is normally empty unless articles have been left on the lower shelf intentionally or unknowingly.

With the foregoing in mind, an object of the present invention is to provide a system for detecting and signalling the presence of articles on the lower shelf of a shopping market cart as it passes through the checkout area thereby to minimize the considerable financial loss occasioned by the removal of articles from the store without having been declared.

Another object of the present invention is to provide a detection system including discriminating means so that only carts with an object on the lower rack section actuate the signalling device.

These and other objects of the present invention and the various features from the description and claims.

BRIEF DESCRIPTION OF THE DRAWINGS

The nature and characteristic features of the invention will be more readily understood from the following description taken in connection with the accompanying drawings forming part hereof, in which:

FIG. 5 is a schematic wiring diagram of the detection and signalling system of the present invention.

Figure 1:
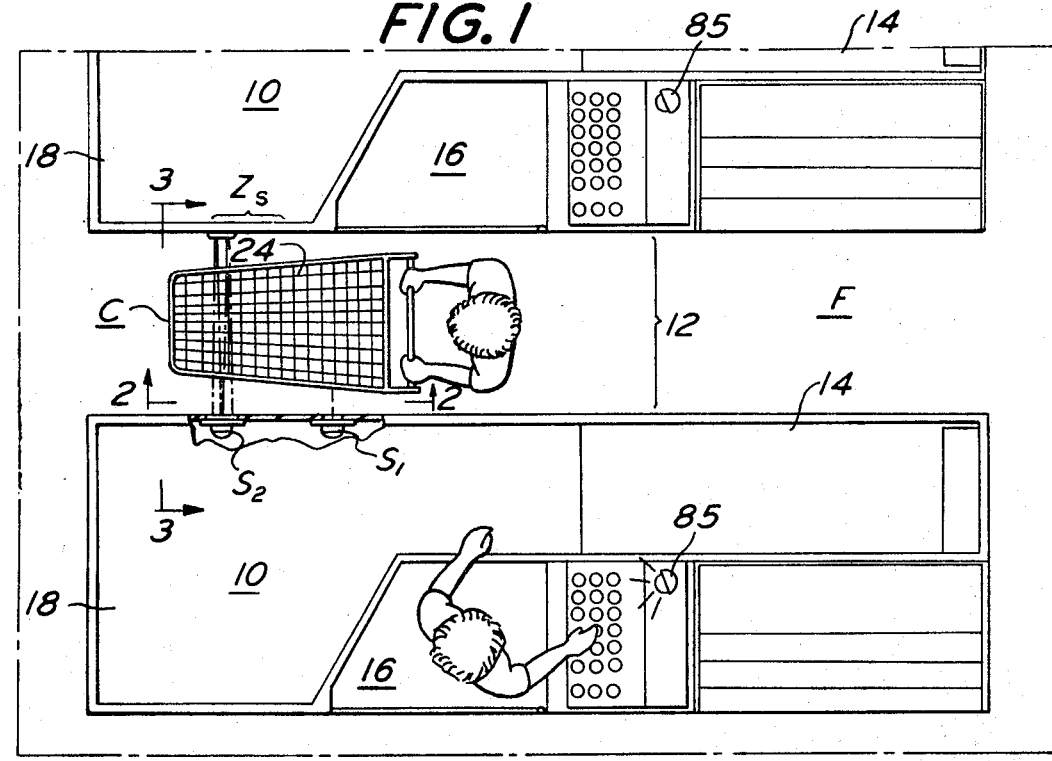
FIG. 1 is a plan view of a portion of a typical market checkout area incorporating a detection and signalling system in accordance with the present invention.
Figure 2:
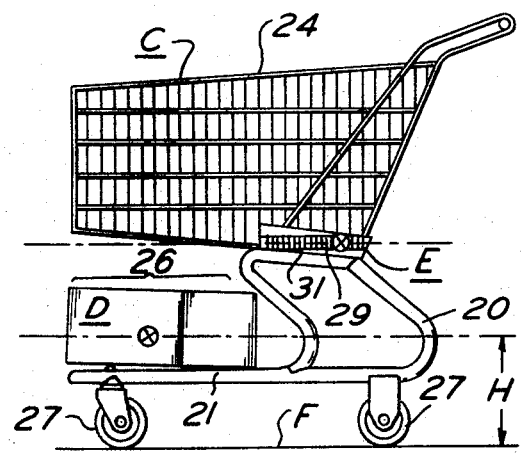
FIG. 2 is an enlarged view of the shopping cart in the scanning zone as viewed on lines 2—2 of FIG. 1.

Referring now to the drawings and particularly to FIG. 1 thereof, there is illustrated a typical checkout area of a supermarket or the like. The checkout area comprises a plurality of side-by-side checkout counters 10 where the items selected from the store are declared and paid for, the counters 10 being spaced apart by aisles 12 through which the customers and carts C must pass. Each checkout counter 10 has a main counter area 14 wherein the items purchased are placed, a recessed area 16 for the cashier, and a discharge area 18 where the checked out items are placed by the cashier prior to packaging in bags. These carts are of conventional construction, and, as shown in FIG. 2, include a frame structure 20 having a lower rack section 21, a basket 24 supported on the frame above the rack section 21 to provide a storage space 26 between the rack section 21 and the bottom of the basket, and rollers 27 depending from the frame to support the cart for movement along the ground.

Figure 3:
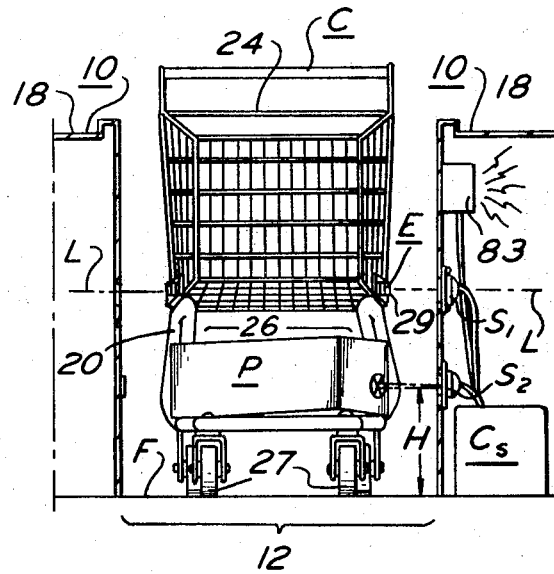
FIG. 3 is an enlarged view of the shopping cart at the scanning station as viewed from line 3—3 of FIG. 1.
Figure 4:
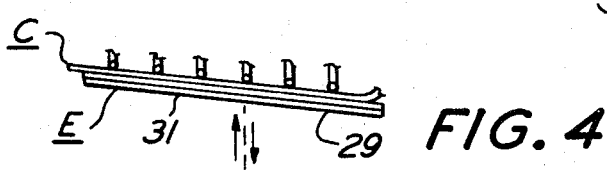
FIG. 4 is a fragmentary schematic illustrating the path of a light beam reflected from a retro-reflecting element on the cast.

As noted above, it has been found that customers tend to use the storage space 26 for larger items which they select in the store. As can be seen from FIGS. 1 and 3, items stored on the lower rack section 21 of the cart are not easily detectable by checkout personnel for the reason that the bottom of the basket shields the lower portion of the cart. Further, each aisle is only of a sufficient width to accommodate a cart and the walls of the counter defining the aisle extend to the top of the cart. In accordance with the present invention, means is provided for signalling the checkout personnel of the presence of items stored on the lower rack section 21 of the cart. To this end, in accordance with the present invention, there is provided a scanning zone or station Zs including a first sensor or sensing means S1 including means for projecting a first light beam along a predetermined path and a photoelectric detector for sensing light reflected from a reflecting element E mounted on the cart C and which is operative to condition a scanning circuit Cs including a second sensor or sensing means S2 to scan the lower storage space 26 of the cart for the presence of objects. The second sensing means S2 also includes means for projecting a second light beam and a photoelectric detector for sensing reflected light. The scanning circuit Cs includes means responsive to the sensors to provide an audible and/or visual signal to the cashier in the event there is an object present on the lower rack 21 of the cart as it passes through the scanning zone Zs.

In accordance with the present invention, the reflecting element E is in the form of an elongated strip 29 mounted at a predetermined location on the side of the cart C so that as the cart C passes through the scanning zone Zs, the light beam projected from the first sensing means S1 is intercepted by the strip and the light is reflected to condition the scanning circuit Cs. In the system illustrated the strip 29 is preferably disposed somewhat lower than the sensor S1 to minimize mirror reflections.

An important feature of the system of the present invention is the provision of discriminating means in the system whereby an alarm signal is emitted only when a cart having an object in the storage space passes through the scanning zone. To this end, the photoelectric detector of the sensor S1 is preferably of the type having a predetermined limited angular receiving area or zone and has a threshold level whereby it emits an output signal to condition the scanning circuit Cs only in response to a reflected beam of a predetermined minimum intensity in its receiving range or zone. Further, the reflecting strip 29 preferably is of the type having a reflecting face 31 exhibiting a high brilliancy reflex reflection of incident light, also referred to herein as having "retro-reflection" capability. Accordingly, by this arrangement only a reflected beam of a given minimum intensity reflected back to the source is operable to effect an output signal from the photoelectric detector of sensor S1 to condition the scanning circuit Cs. A suitable reflector material is one manufactured and sold under the tradename "Scotchlite" (No. 3870) by Minnesota Mining and Manufacturing Company, St. Paul, Minnesota, and disclosed and claimed in McKenzie U.S. Pat. No. 3,190,178, assigned to Minnesota Mining and Manufacturing Company. The reflecting surface of this material has a high degree of reflectance and reflects substantially all light from a source back to the source over a large angle of incidence, thereby insuring pickup of the reflected beam in a small angular range of the sensor and substantially irrespective of the angular position of the cart as it is moved through the scanning zone. This feature minimizes the possibility of conditioning the scanning circuit by reflecting means which either does not have a high enough reflectance or does not reflect the beam within the angular receiving area of the sensor, such as for example, the frame of the cart, yet assures conditioning when the cart if at various angles other than normal to the incident beam.

Considering now the specific details of the circuitry of the detecting system and with reference to the schematic diagram of FIG. 5, there is provided a main electrical supply source 30 having supply lines 32 and 34. One terminal of the photocell of the first sensor S1 is connected to supply line 34 through lead 38, and the other terminal to supply line 32 by way of lead 40, the actuating coil 42 of normally-open relay 45, and lead 46. Switch arm 44 of relay 45, when closed, is connected through lead 47 to control switch 58 of the scanning circuit Cs.

One terminal of the photocell of the second sensor S2 of the scanning circuit Cs is connected through lead 52 to the supply line 34, and the other terminal is connected to supply line 32 through lead 54, actuating coil 56 of the relay 57, and lead 60. As illustrated, relay 57 is normally energized to maintain its switch arm 58 in an open position. The other contact of relay 57 connects via lead 71 to relay coil 75 of relay 76 which has two ganged switch arms 77 and 79. Arm 77, when closed, connects supply line 32 to one terminal of visual signalling device 85 through lead 87, and to the upper end of relay coil 75 by way of lead 91.

Arm 79 of relay 76, when closed, connects the supply line 34 to lead 81, variable resistor 82, and the lower terminal of audio signalling device 83, the upper terminal of which is connected to supply line 32. Relay coil 75 is also connected to the supply line 34 by lead 99, thermal delay device 101 and switch 103.

Considering now the operation of the system, assume that a cart C with a purchased item P on its lower shelf 26 is passed through the checkout area into the scanning zone, to the position of the cart shown in FIG. 1. In this instance the first light beam of the upper sensor S1 is reflected from the reflecting element E on the cart and thereby through photocell of sensor S1 energizes relay 45 to close switch arm 44, which conditions the scanning circuit Cs for operation. The package P interrupts the second light beam of the lower sensor S2, deenergizing relay 57 and completing an energizing circuit via lead 71 to coil 75 of relay 76. Energization of the coil 75 of the relay contact 76 closes switches 77 and 79 to complete the circuit through lead 81 to the audio-signalling device 83 and via lead 87 to the light-signalling device 85 on the cash register. Lead 91 then maintains the coil 75 of relay 76 in an energized condition. When a cart having an item P on its lower shelf is in the scanning zone and the audio signal 83 and signal light 85 are energized in the manner set forth above, the duration of the audible and visual alarms is limited by the thermal delay device 101. More specifically, after a predetermined time delay from closing of ganged switch arms 77 and 79, for example five seconds, the normally closed switch 103 opens as determined by the thermal delay device 99 thereby opening the circuit to the audio signal 83 and light signalling device 85. After the cart C moves out of the scanning zone, relay 45 is deenergized to open switch arm 44 and relay 57 is energized to open switch 58, whereby coil 75 of relay 76 is deenergized to open switch arms 77 and 79 and in turn to open the circuit to the audible and visual signalling devices 83 and 85. In the event the cart C with an item on its lower rack section remains in the scanning zone, the audible and visual signalling devices repeat their signals at predetermined spaced intervals as determined by the thermal delay 101. Note that the scanning circuit remains conditioned so long as the first light beam from the sensor S1 is reflected from the reflecting strip 29, and in order to scan the useful area of the storage space 26, the sensor S2 is located at a predetermined level H about the floor F so that the second light beam is projected above the lower frame section. Additionally, sensor S2 is spaced laterally forward of sensor S1 so that as the lead portion of reflective strip 29 comes into range of the first light beam from sensor S1, the second light beam from sensor S2 is directed across the lead portion of the storage space 26. Further, the strip 29 is of a predetermined length so that during the period the beam from sensor S2 intercepts the depth of the storage space 26, the scanning circuit is conditioned.

On the other hand, assume that a cart C without an item P on its lower shelf passes through the checkout area into the scanning zone. In this instance the first light beam of the sensor S1 is reflected from the reflecting element E on the cart thereby again conditioning the scanning circuit Cs by energizing relay 45 to close switch arm 44. However, in this instance, since there is no package P in the storage area 26 to interrupt the second light beam from the lower sensor S2, the scanning circuit is not conditioned for the reason that relay 56 remains energized to hold switch 58 open. This being the case, the armature relay 75 remains deenergized and the switch arms 77 and 79 remain open. Thus, the circuits to the audio signal and the signal light 85 are not completed and hence there is no audible or light signal.

One of the important features of the detection system of the present invention is the orientation of the scanning elements in the scanning zone and the particular circuit described above which effectively discriminate and limit actuation of the audio signal and light signal to carts having an item P on the lower shelf which, as noted above, would be difficult for the personnel in the checkout areas to detect. This is true for several reasons. First of all, with the particular type of reflective element E described above, the scanning circuit is conditioned only when the reflective beam is of a given intensity and in a particular angular range of the sensor S1. In this regard it has been found that a shiny purse or even a coin would not be effective in conditioning the scanning circuit. Secondly, even if a reflective element on an object other than a cart were to condition the scanning circuit, the probability is that the reflective element of the object would pass out of the range of the beam of the sensor S1 when the object passed through the beam of the sensor S2 because of the orientation of the scanning zone.

I claim:

1. A system for detecting an article or the like on the lower storage section of a market cart as the cart passes through a scanning zone wherein the cart having a light reflective element mounted thereon is operable to reflect a substantial portion of the light projected from a source back to said source, comprising sensing means having a threshold level and operable to direct a beam of light to said reflective element and produce an output signal only when the intensity of light reflected back to the sensing means exceeds said threshold level, scanning means operable when conditioned by the output signal from said sensing means to scan the storage section of the cart when it passes through a scanning zone, signal means operatively associated with said scanning means actuatable when said scanning means is conditioned and an article is present in the storage section of the cart.

2. A system as claimed in claim 1 wherein said scanning means includes a second means for projecting a second beam of light along a predetermined path to be intercepted by an article in the lower storage section.

3. A system for detecting an article or the like in the lower storage section of a market cart, the cart having a retroreflective element thereon capable of reflecting a wide incidence angle range a substantial portion of the light projected from a source back to the source, comprising a sensor having means for projecting a beam of light along a predetermined path and receiving means closely adjacent said projected means and having a small angular receiving zone operable to produce an output signal when light from said projecting means is reflected from said retro-reflective element, scanning means operable when conditioned by the output signal from said sensing means to scan the storage section of the cart when it passes through a scanning zone, signal means operatively associated with said scanning means actuatable when said scanning means is conditioned and an article is present in the storage section of the cart.

4. A system for detecting an article or the like on the lower storage section of a market cart, the cart having a light reflective element mounted thereon, comprising means defining an aisle having a scanning zone through which the carts pass, a first sensing means along said aisle including means for projecting a first light beam across said aisle in a plane to be intercepted by the light reflecting element on said cart, and means producing an output signal, a scanning circuit, means operative to condition said scanning circuit when the first light beam from said first sensing means is reflected back to said first sensing means, said scanning circuit including a second sensing means including means for projecting a second light beam across said aisle along a predetermined path to be intercepted by an article in the lower storage section of the cart, a signal means operable only when said scanning circuit is conditioned and said second light beam is intercepted by an article in the storage section of the cart.

5. A system as claimed in claim 4 wherein said first sensing means includes a first light receiver adjacent said projecting means having a threshold operable to produce the output signal when the intensity of the reflected beam exceeds the threshold level of said first receiver and the reflective element has retro-reflective capability operable in a predetermined wide range of incidence angle to reflect light from said first projecting means to said first receiver.

6. A system as claimed in claim 4 wherein said reflective element is in the form of a strip of a predetermined length located relative to the sensing means so that the scanning circuit is conditioned when the storage section of the cart is in the range of said second light beam.

7. A system as claimed in claim 4 wherein said signal means comprises audio and visual indicators.

* * * * *